July 6, 1965  W. F. STACKHOUSE  3,193,074
COIN CONTROLLED LOCKS
Filed Oct. 12, 1961  5 Sheets-Sheet 1
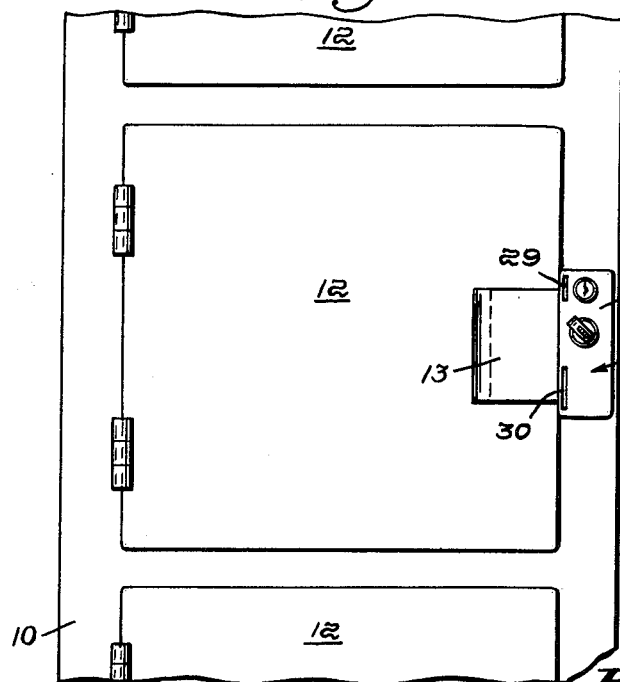
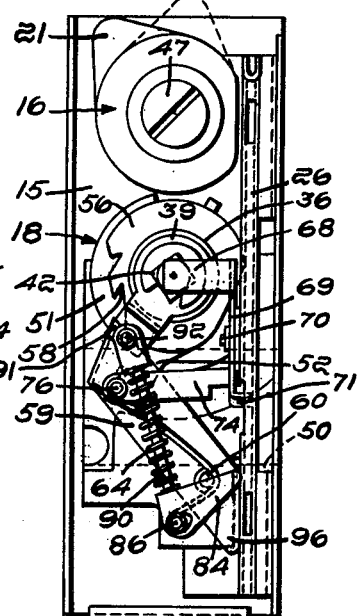
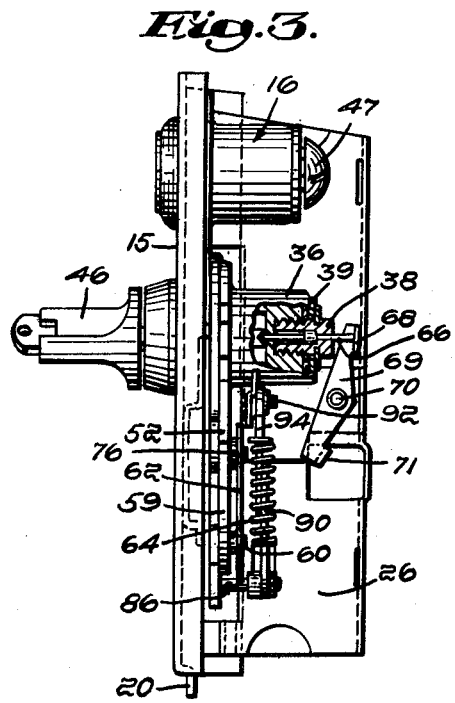
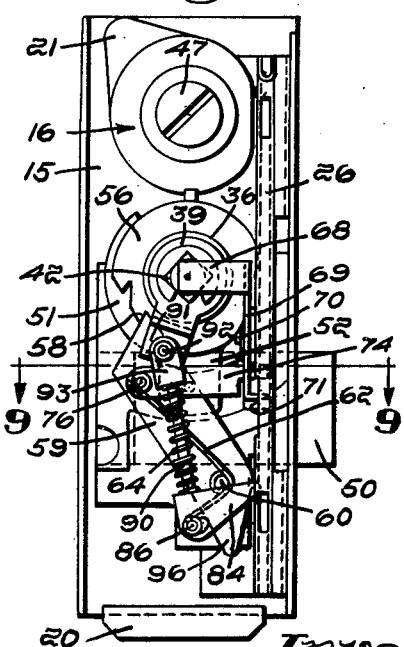
Inventor:
Wells F. Stackhouse,
by
Attorney

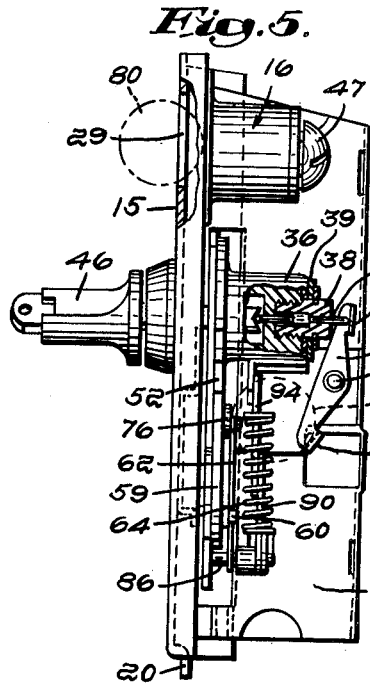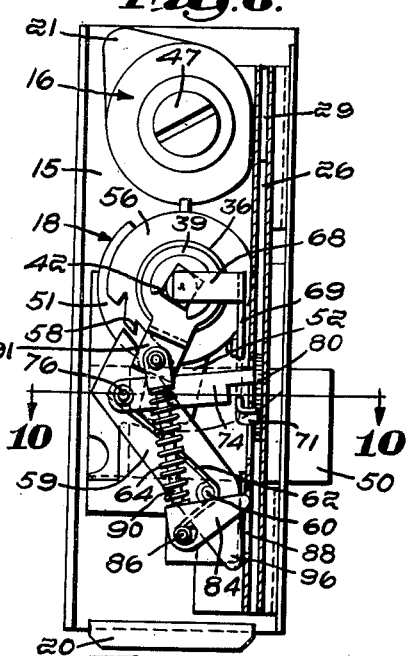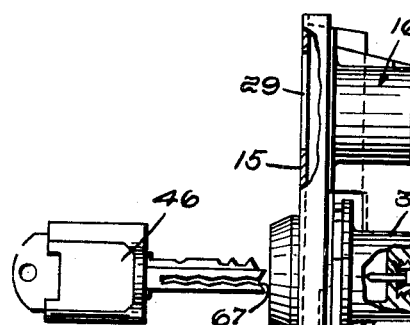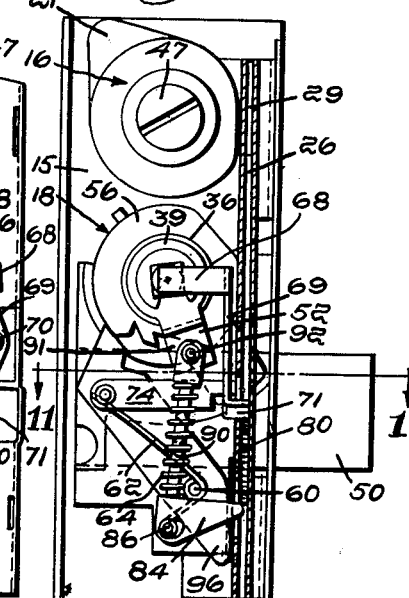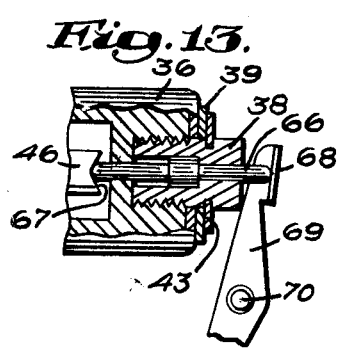

July 6, 1965
W. F. STACKHOUSE
3,193,074
COIN CONTROLLED LOCKS
Filed Oct. 12, 1961
5 Sheets-Sheet 3
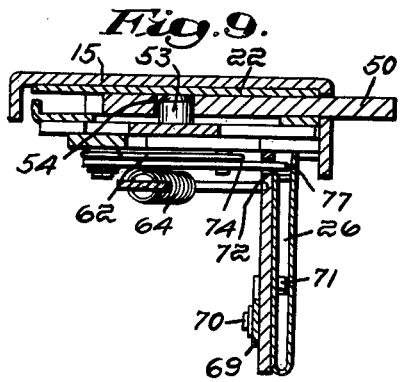
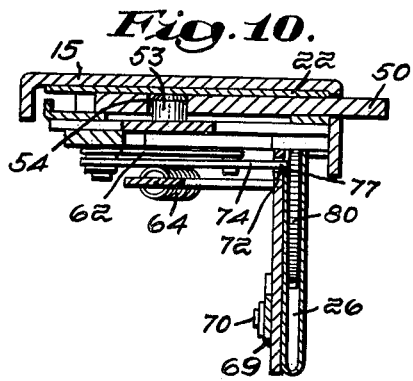
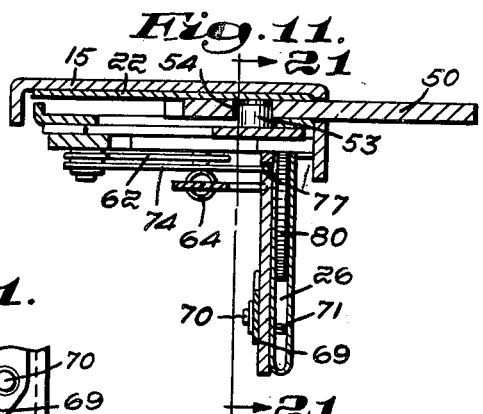
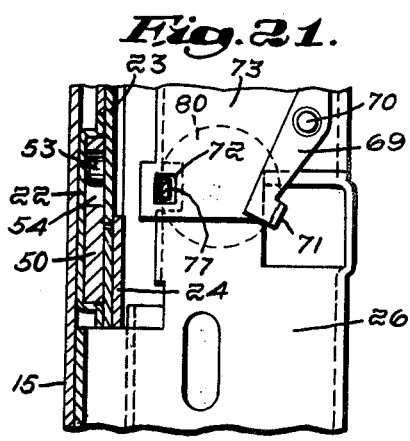
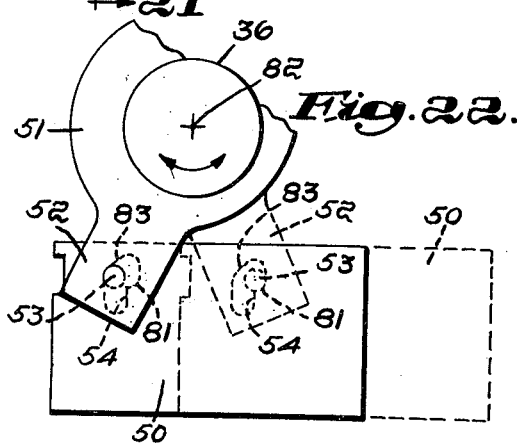
Inventor:
Wells F. Stackhouse,
by
Attorney

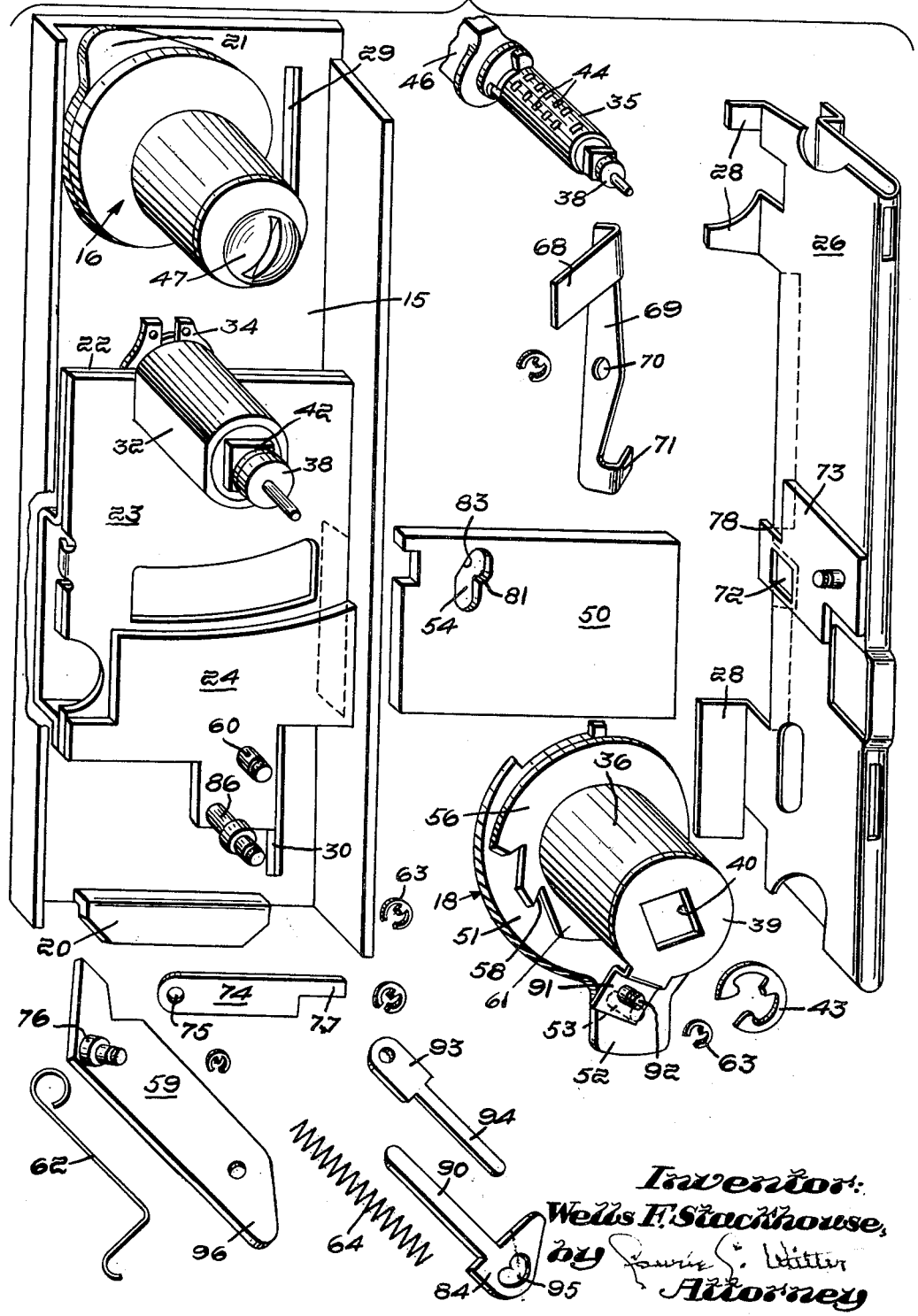

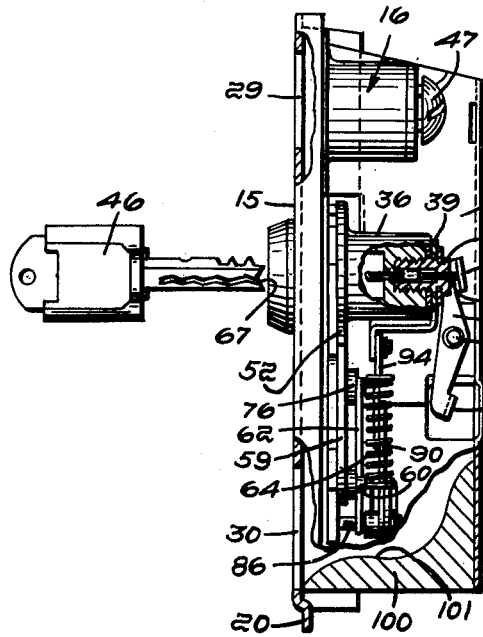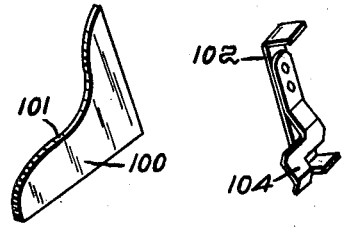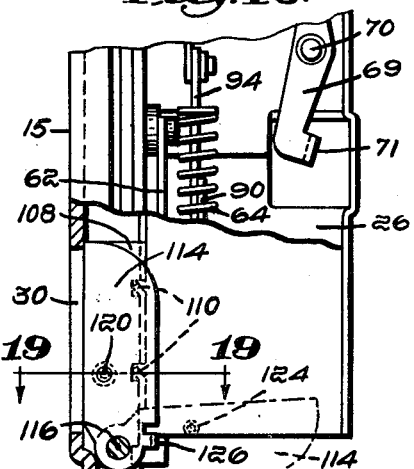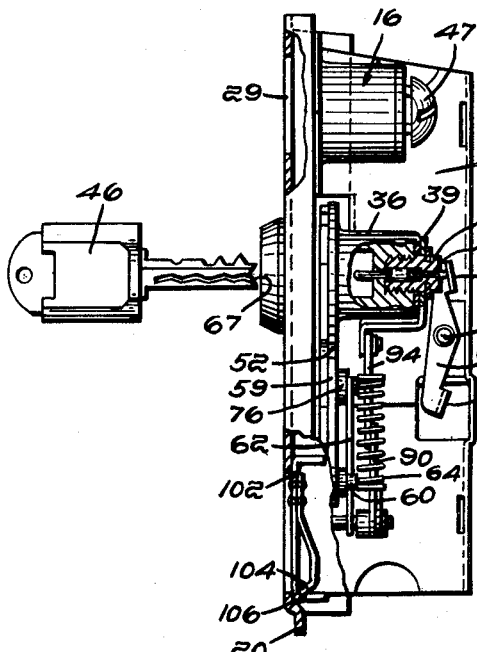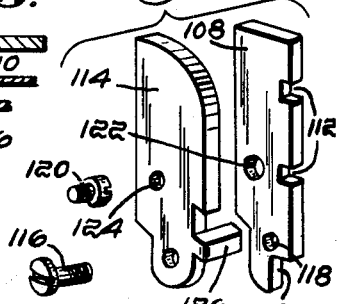

United States Patent Office 3,193,074
Patented July 6, 1965

3,193,074
COIN CONTROLLED LOCKS
Wells F. Stackhouse, Andover, Mass., assignor to American Locker Company, Inc., Boston, Mass., a corporation of Delaware
Filed Oct. 12, 1961, Ser. No. 144,755
5 Claims. (Cl. 194—92)

This invention relates to coin controlled locks and particularly to such locks as are employed in checking and vending cabinets. As illustrated in Patents 2,222,434 and 2,437,742, a coin controlled and key operated lock of this nature is employed with each checking cabinet, the lock being secured to the cabinet in position to cooperate with the closure door (FIG. 1). When the cabinet is not in use the lock is in unlocked position and the door can be opened for depositing parcels in the cabinet. The depositing of a coin in the lock functions to permit the key to be rotated to the door locking position and thereafter to be removed and taken by the patron as his check.

The primary object of the invention is to produce a lock of this nature having fewer and simpler parts and so constructed and assembled as to form a simpler, stronger and more economical lock unit for the purpose described and, furthermore, adapted through minor modifications to serve additional and important functions.

An important feature of the invention relates to novel means for intercepting the released coin and retaining it in the lock when the locking bolt is moved to locking position and again releasing the coin and permitting it to drop from the lock when the bolt is returned to unlocked position, the coin intercepting means preferably being connected to and operated by the bolt moving mechanism.

The locking bolt is connected to and adapted to be moved to locking and unlocking positions by a barrel rotatably mounted in the lock and a further feature of the invention relates to spring actuated means for automatically moving the barrel and bolt to the locking and unlocking positions from an intermediate position and simultaneously therewith move the coin intercepting means to the coin intercepting and releasing positions respectively.

The lock as normally constructed is adapted to drop the released coin into a coin box inaccessible to the patron, thus rendering a prepaid service to each patron. A further feature of the invention relates to novel means cooperating with the lock and optionally adapting it to render such prepaid service or free service. For this purpose the lock is provided with an upper coin receiving slot and a lower coin return slot together with means adjustable to a position for intercepting the released coin and returning it to the patron when free service is to be rendered.

Attempts to beat the lock, as by plugging the coin slot with slugs, paper etc., is a constant and troublesome hazard, and a further object of the invention relates to novel means for combatting this hazard. This means includes the locating of the coin receiving slot remotely above the coin feeling position and a novel coin feeler disposed to engage a marginal portion only of a coin supported in such position, all as hereinafter more specifically described.

Attempts have also been made to beat the lock by forcing the locking bolt rearwardly from its locking position, and a further object of my invention resides in novel mechanism for eliminating this hazard. This mechanism includes a novel pin and slot connection between the bolt and its rotary actuating barrel for positively blocking the bolt against such forced movement from its locking position.

These and other features of the invention will be best understood and appreciated from the following description of preferred embodiments thereof selected for purposes of illustration and shown in the accompanying drawing in which:

FIG. 1 is a fragmentary front elevation of a bank of checking lockers employing the invention, FIG. 2 is an enlarged rear elevation of the lock in unlocked position, FIG. 3 is a side elevation, partly broken away, FIG. 4 is a rear elevation showing the locking bolt moved forwardly from the position of FIG. 2, FIG. 5 is a side elevation, partly broken away and illustrating the supporting of a coin in feeling position in the lock, FIG. 6 is a rear elevation illustrating the feeling of the coin, FIG. 7 is a side elevation, partly broken away and illustrating the release of the coin when the key is removed, FIG. 8 is a rear elevation showing the locking bolt in locking position, FIG. 9 is an enlarged sectional view taken on line 9—9 of FIG. 4, FIG. 10 is a like view taken on line 10—10 of FIG. 6, FIG. 11 is a like view taken on line 11—11 of FIG. 8, FIG. 12 is an exploded view of parts comprising the lock, FIG. 13 is an enlarged sectional view of a portion of FIG. 5, FIG. 14 is a side elevation of the lock, partly in section and illustrating the use of a coin return insert shown in FIG. 15, FIG. 15 is a perspective view of the coin return insert, FIG. 16 is a side elevation of the lock, partly in section and illustrating the use of a coin return slot closure insert shown in FIG. 17, FIG. 17 is a perspective view of the closure insert, FIG. 18 is an enlarged fragmentary view of the lock provided with an element adapted in optional positions to either return the released coin or close the return coin slot, FIG. 19 is a fragmentary sectional view taken on lines 19—19 of FIG. 18, FIG. 20 is an exploded view of parts shown in FIGS. 18 and 19, FIG. 21 is a view taken on line 21—21 of FIG. 11, and FIG. 22 is a fragmentary elevation of the mechanism for moving the locking bolt and positively holding it in locking position.

In the drawings, 10 indicates a bank of coin controlled checking cabinets and 12 indicates the closure door of one of the cabinets. A hand gripping block 13 is provided on the door. The lock unit 14 is removably secured to a marginal portion of the cabinet in position to cooperate with and lock the door. This unit comprises a face plate 15 and cooperating parts supporting two key-operated rotary locks 16 and 18 thereon rearwardly of the face plate, each unit being disposed over and filling an opening through a fixed margin of the cabinet adjacent to the door 12. The unit is thus removably secured in place by the cooperation of a lip 20 on the bottom end of the face plate and a locking lip 21 carried by the lock 16.

The lock 18 is coin controlled and its primary function is to permit locking of the door 12 only when the required coin has been deposited in the lock. The lock is extremely simple and of rugged and economical construction, comprising a minimum number of all dieformed parts of stainless steel, as illustrated in FIG. 12. The lock is carried on the rear face of the face plate 15 through the employment of a frame including combined plates 22, 23 and 24, the plate 22 being secured to the face plate and to the remaining plates as by spot welding. A relatively long and U-shaped coin guide 26 is provided with feet 28 spot welded to the face plate and upper and lower coin passage slots 29 and 30 into the guiding channel are formed through the face plate at the top and bottom ends of the guide.

The lock 18 comprises a tubular member 32 non-rotatably supported on the frame 22–23 by a split ring 34 and adapted to receive axially thereinto through the face plate 15 the key-operated tumbler barrel 35 shown in FIG. 12, and a cylindrical member 36 is rotatably mounted on the member 32. A threaded plug 38 is seated tightly and axially within and projects outwardly of the inner end of the barrel 35. A disc 39 disposed over the inner end of the barrel (FIGS. 7 and 13) is provided with a square opening 40 for receiving the square end portion 42 of the barrel, and a split ring 43 engages the disc and barrel and holds the barrel assembled within the members 32 and 36. The barrel is provided with tumblers 44 which normally maintain the barrel in predetermined rotary position in the member 32. Insertion of the key 46 withdraws the tumblers and permits rotation of the barrel. The lock 16 is of similar construction and its tumbler barrel can be withdrawn by removing the screw 47 which secures the barrel as does the split ring 43 in the lock 18.

A rectangular locking bolt 50 is mounted for movement in the lock to and from the door unlocked position of FIG. 2 and the locking position of FIG. 8. A disc 51 carried on the forward end of the member 36 and having an arm 52 provided with a stud 53 engaging in a slot 54 in the locking bolt serves upon rotation of the member thus to move the bolt. A disc 56 carried on the member 36 is notched to provide a shoulder 58 for cooperating with a pawl 59 pivoted to the plate 24 at 60. A spring 62, hereinafter described, serves normally to pivot the pawl into contact with the disc 56 in position to be engaged by the shoulder. A split ring 63 holds the pawl and spring on the pivot pin 60. The lock is illustrated in normal unlocked position in FIG. 2, in which position the portion 61 (FIG. 12) of disc 56 has moved the pawl 59 outwardly beyond the shoulder 58. When the member 36 is rotated forwardly (anti-clockwise in FIGS. 2 and 12) from this position the shoulder engages the pawl and limits such movement to the position shown in FIG. 4. The lock is illustrated in door locking position in FIG. 8 and means including a spring 64, hereinafter described, maintains the lock in one or the other of these positions from an intermediate position.

Mounted to slide axially within and projecting outwardly of the plug 38 is a rod 66 (FIG. 13) having an enlarged middle portion for limiting such movement. The inner end of the rod is disposed to be engaged and centered within a V-notch 67 in the forward end of the key 46. The outer end of the rod is disposed to engage the offset top end 68 of a lever 69 pivoted at 70 and having a bottom end portion 71 disposed to provide an abutment for intercepting and supporting a coin in the predetermined position illustrated in FIGS. 4 and 5. The portion 71 of the lever extends through an opening 72 through a plate 73 fixed to the guide 26 and into the coin guiding channel. When the key is in the lock it holds the lever in coin intercepting position (FIG. 5) and when the key is withdrawn the coin is released as illustrated in FIG. 7.

A coin feeling bar 74 is pivotally connected at its rear end 75 to a stud 76 on the pawl 59 and its reduced forward end 77 rests on a notched portion 78 of the plate 73 and extends into an opening through one wall of the U-shaped coin guide 26 in position to contact a marginal portion (FIG. 21) of a coin 80 held in the predetermined position shown in FIGS. 5 and 6. When no coin is present in such position, the feeler is free to move into the coin channel (FIG. 4) thus permitting engagement of the shoulder 58 with the pawl 59. When a coin is present in such position the feeler engages the coin and holds the pawl outside the shoulder (FIG. 6), thus permitting rotation of the lock to door locking position. The engagement of the coin adjacent to its margin serves the important function of rendering more difficult the unauthorized operation of the lock with paper or slugs and also helps to differentiate between coins of different diameters.

The movement of the locking bolt 50 to and from the locking and unlocking positions is illustrated in FIG. 22 and it is noted that such movements are permitted as long as the key remains in the lock. Attempts have been made to beat the lock by forcing the locking bolt rearwardly from its locking position and an important feature of the invention comprises mechanism illustrated in FIG. 22 for eliminating this hazard. The bolt is moved by rotation of the lock member 36 by means of the stud 53 on the arm 52 extending into the slot 54 in the bolt. The bolt is located beneath the member 36 and so disposed that the slot 54 is forwardly of the rotary axis 82 of the member when the bolt is in door locking position and is rearwardly of the axis when the bolt is in unlocked position. The slot has an upper forwardly extending portion or lobe for receiving the stud when the bolt is in either of its two extreme positions and a merging lower downwardly extending portion or lobe for receiving the stud during its travel beneath the said axis. The upper portion of the slot has at one margin a somewhat concave shoulder 81 facing the axis 82 when the bolt is in locking position and a stud contacting surface 83 at its opposite margin. When the bolt is in locking position any rearward pressure on the bolt is positively resisted by contact of the shoulder against the stud which must necessarily move downwardly upon rearward movement of the bolt, thus positively preventing rearward movement of the bolt. Rearward rotation of the member 36 however lifts the stud from the shoulder 81 and engages it with the surface 83 whereupon the bolt is moved to the unlocked position, the stud freely passing downwardly into the lower portion of the slot.

The key can be removed from the lock only when the bolt is in door locking position and when the key is thus removed the coin is released as shown in FIGS. 7 and 8. In prepay checking cabinets the released coin is permitted to drop from the lock into a coin box. However in rental cabinets where the coin is to be returned to the patron, as hereinafter described, it is desirable that final release of the coin shall be delayed until the lock has been returned to the unlocked position wherein the key cannot be removed from the lock. The invention includes the following described mechanism for performing this function.

An element 84 pivoted on a stud 86 carried on the plate 24 has an end portion extending into a slot 88 in the coin guide 26. When the element is in the position of FIG. 6 its end portion is outside the coin channel and when it is in the position of FIG. 8 the end portion extends into coin intercepting position in the channel. An arm 90 integral with the element extends upwardly within the spring 64. The disc 39 has an integral arm 91 extending radially outward and carrying a stud 92. An element 93 is mounted on the stud and has an arm 94 extending downwardly in the spring 64 and overlapping the arm 90. The arms together with the spring thus provide a connection between the stud 92 and the element 84. The expansive effort of the spring functions to rotate the member 36 from an intermediate position to the two positions shown in FIGS. 6 and 8 and to hold the member in such positions. Simultaneously therewith the spring and arm connection automatically rotates the element 84 to the two positions illustrated in FIGS. 6 and 8. When the coin is released by removal of the key in FIGS. 7 and 8 it is intercepted and supported at a lower level by the end portion of the element 84 which extends into the coin channel. When the lock is returned to the unlocked position the element 84 is withdrawn and the coin again released.

The pivot opening 95 in the element 84 is heart shaped (FIG. 12) including two lobe-like portions for engaging over the stud 86. When the rear lobe rests on the stud, as in FIGS. 6 and 8, the element is disposed in a forward position and functions to intercept the released coin and when the forward lobe rests on the stud the element is in a rearward position wherein it will not intercept the coin. Thus this simple adjustment provides for final release of the coin from the lock in either the door locking or unlocked position. The spring 62 rests on the stud 60 and its end portions engage rearwardly about the studs 76 and 86, thus serving normally to move the pawl 59 and coin feeler 74 forwardly. A projecting end portion 96 on the pawl is disposed to engage the coin guide 26 and prevent outward movement of the pawl beyond the position illustrated in FIG. 8.

In FIGS. 14–20 I have illustrated novel means cooperating with the lock to return the released coin to the patron when such service is desired. This means, as illustrated in FIGS. 14 and 15, comprises a plate 100 adapted to be inserted into the bottom end of the coin guiding channel and having its upper margin 101 inclined downwardly-forwardly in position to intercept the released coin and direct it outwardly of the slot 30 as illustrated in FIG. 14. When the coin is not to be thus returned to the patron it is desirable that the slot 30 shall be closed. In FIGS. 16 and 17 I have shown an element 102 for performing this function. The element is adapted to be inserted in the lock to the position illustrated in FIG. 16 wherein its front plate closes the slot and a resilient latch 104 engages the ledge at 106 and holds the element in place.

In FIGS. 18–20 is illustrated a single means for performing both such functions. This means comprises a plate 108 disposed within the lock between the coin guide 26 and the adjacent wall of the lock and anchored in place by ears 110 integral with the coin guide and bent into notches 112 in the plate. An element 114 within the coin channel is pivotally mounted on a stud 116 threaded into the plate at 118. When the element is in the full line position of FIG. 18 it closes the coin slot 30 and is held in this position by a stud 120 extending through the plate at 122 and threaded into the element at 124. When the element is in the broken line position its top margin is inclined downwardly-forwardly to direct the released coin outwardly of the slot. A lug 126 on the element is adapted to engage a shoulder 128 on the plate and support the element in this position.

Particular attention is directed to the very versatile character of my coin controlled lock as herein described. The lock permits individual checking for a predetermined service charge in which case the released coin is deposited in a collection box beneath the lock, and a relatively simple adjustment adapts the lock to free checking in which case the coin is returned to the patron. The latter service is employed when use of the lockers has been leased or free service otherwise given to patrons, as described in my copending application Ser. No. 812,173 filed May 11, 1959, now Patent No. 3,037,605. Also in this latter use it is desirable that the coin shall not be returned until the lock has been moved to its unlocked position, and a simple adjustment of the member 84 provides for optionally returning the coin either in the locked or unlocked position. The lock also permits of easy modification adapting it to function on coins of different diameters.

Having thus disclosed my invention what I claim as new and desire to secure by Letters Patent is:

1. A coin controlled lock mounted on a supporting frame and including a rotary barrel and a locking bolt connected thereto and movable therewith to locked and unlocked positions, a pawl pivoted to the frame and normally operative to retain the bolt in unlocked position, means providing a coin slot in the lock, means for retaining in predetermined position a coin deposited in the slot, other means including a coin feeler disposed to engage a coin supported in said position and render the pawl inoperative and permit locking movement of the bolt, means for releasing the coin when the bolt is in locked position, and means for intercepting and supporting the released coin at a lower level in the lock and for again releasing the coin when the bolt is moved to unlocked position.

2. The combination defined in claim 1 plus means mounting said coin intercepting means for movement to and from coin supporting position, and means, other than said coin retaining means, connecting the coin intercepting means to the barrel for movement thereby to coin intercepting and releasing positions respectively when the barrel is rotated to said locked and unlocked positions.

3. The combination defined in claim 1 plus means for adjusting the last named means to two positions wherein it is respectively operative and inoperative to intercept and release the coin.

4. A coin controlled lock including a rotary barrel and a locking bolt connected thereto and movable therewith to locked and unlocked positions, an element mounted for movement to coin intercepting and releasing positions in the lock, means including an arm pivotally connected to the barrel and so connected to said element to pivot it to said positions, and means including a spring coil on the arm between the pivotal connection to the barrel and said element for automatically rotating the barrel to said locked and unlocked positions from an intermediate position and simultaneously therewith moving said element alternately to said coin intercepting and releasing positions.

5. The combination defined in claim 4 plus means mounting said element for adjustment to operative and inoperative positions wherein it is respectively movable and not movable to said coin intercepting position.

References Cited by the Examiner
UNITED STATES PATENTS

| | | | |
|---|---|---|---|
| 389,646 | 9/88 | Gunniss | 292—143 |
| 686,166 | 11/01 | Taylor | 292—140 |
| 1,034,604 | 8/12 | Farnsworth. | |
| 1,628,711 | 5/27 | Dobkin | 194—92 |
| 1,933,263 | 10/33 | Hofmann | 194—92 |
| 1,979,805 | 11/34 | Main | 70—134 |
| 2,437,742 | 3/48 | Hofmann | 194—92 |
| 2,684,144 | 7/54 | Biemel | 194—92 |
| 2,767,570 | 10/56 | Garver | 194—59 |
| 2,797,570 | 7/57 | Fresard | 70—129 |
| 2,861,667 | 11/58 | Smith | 194—92 |
| 2,997,151 | 8/61 | Chandler. | |
| 3,006,179 | 10/61 | Erickson | 70—129 |

SAMUEL F. COLEMAN, *Primary Examiner.*

WILLIAM B. LA BORDE, *Examiner.*